United States Patent [19]

Takada

[11] Patent Number: 5,203,592
[45] Date of Patent: Apr. 20, 1993

[54] FLUID COUPLING DEVICE

[75] Inventor: Toru Takada, Bisai, Japan

[73] Assignee: Brother Kogyo Kabushiki Kaisha, Nagoya, Japan

[21] Appl. No.: 764,904

[22] Filed: Sep. 24, 1991

[30] Foreign Application Priority Data

Nov. 29, 1990 [JP] Japan .................................. 2-335981

[51] Int. Cl.$^5$ ............................................. F16L 55/00
[52] U.S. Cl. ....................................... 285/14; 285/281
[58] Field of Search ........................... 285/276, 14, 281

[56] References Cited

U.S. PATENT DOCUMENTS

| | | | |
|---|---|---|---|
| 3,129,960 | 4/1964 | Schrodt | 285/14 X |
| 3,889,983 | 6/1975 | Freize et al. | |
| 3,913,952 | 10/1975 | Matsui et al. | 285/281 |
| 3,957,294 | 5/1976 | Hoban et al. | 285/276 |
| 4,449,739 | 5/1984 | Raether | 285/281 X |
| 5,052,720 | 10/1991 | Yoda | 285/281 X |
| 5,058,927 | 10/1991 | Miwa | 285/276 X |

FOREIGN PATENT DOCUMENTS 1-84941 6/1989 Japan .

Primary Examiner—Dave W. Arola
Attorney, Agent, or Firm—Oliff & Berridge

[57] ABSTRACT

In a non-contacting fluid coupling device for feeding fluid to a hollow core of a rotating tool, one end of a hollow coupling shaft is attached in fluid communication to the shaft of the rotating tool. The other end of the coupling shaft is received, in a non-contact manner, in a hollow of a coupling main body. The coupling main body has an opening and passage in fluid communication with the hollow coupling shaft to introduce high pressure fluid to the hollow core of the rotating tool. Between the hollow of the coupling main body and the coupling shaft is at least one pressure reduction passage. Downstream of each pressure reduction passage is a pressure reduction chamber having a drain hole to the atmosphere. Downstream of the last pressure reduction chamber is a minute space between the coupling main body and the coupling shaft into which is introduced compressed air that precludes leakage of the fluid further downstream in the coupling device.

13 Claims, 5 Drawing Sheets

FLUID COUPLING DEVICE

BACKGROUND OF THE INVENTION

1. Field of the Invention

The present invention relates to a fluid coupling device to lead a fluid into a rotary shaft rotated at high speed.

2. Description of Related Art

Figure 4:
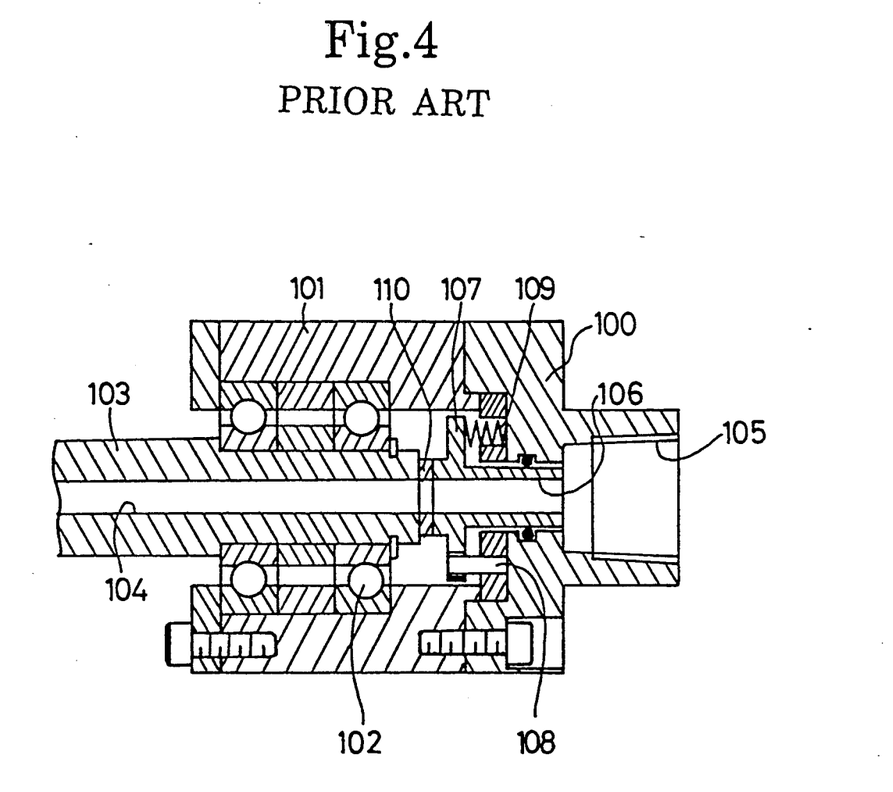
FIG. 4 is a cross-sectional view showing a conventional contact type fluid coupling device.

One type of conventional fluid coupling device is shown in FIG. 4. This fluid coupling device is a contact type fluid coupling device which uses a contact type mechanical sealing system. In a coupling main body 101 having a generally cylindrical shape, bearings 102 are provided. A coupling shaft 103 is rotatably supported by the bearings 102. The left end of the coupling shaft 103 is coaxially fixed to a rotatable main shaft (not shown) of a machine tool. Therefore, the coupling shaft 103 is rotatable together with the main shaft. In the coupling shaft 103, an axial fluid passage 104 is formed. The fluid passage 104 is opened at the right end surface of the coupling shaft 103.

A rear body 100 is fixed at the right end surface of the coupling main body 101. A fluid supply port 105 is formed in the rear body 100. In the coupling main body 101, a seat ring 107 is provided slidable in an axial direction of the coupling main body 101 and coupling shaft 103. The rotation of the seat ring 107 is restricted by a pin 108. A fluid passage 106 which communicates with the fluid supply port 105, of the rear body 100, is formed in the center of the seat ring 107. A spring 109 is provided between the seat ring 107 and the rear body 100. The seat ring 107 is urged toward the left direction, in FIG. 4, by the spring 109.

A follower ring 110 is fixedly coupled to the right end surface of the coupling shaft 103. The left end surface of the seat ring 107 is urged to be pressed toward the right end surface of the follower ring 110 by the spring 109. When a coolant is supplied from the fluid supply port 105 to the fluid passage 104, of the coupling shaft 103 which is rotated with the main shaft of the machine tool, through the fluid passage 106, the follower ring 110 is hermetically and slidingly rotated relative to the end surface of the seat ring 107. The fluid passages 104 and 106 are, therefore, hermetically sealed.

Figure 5:
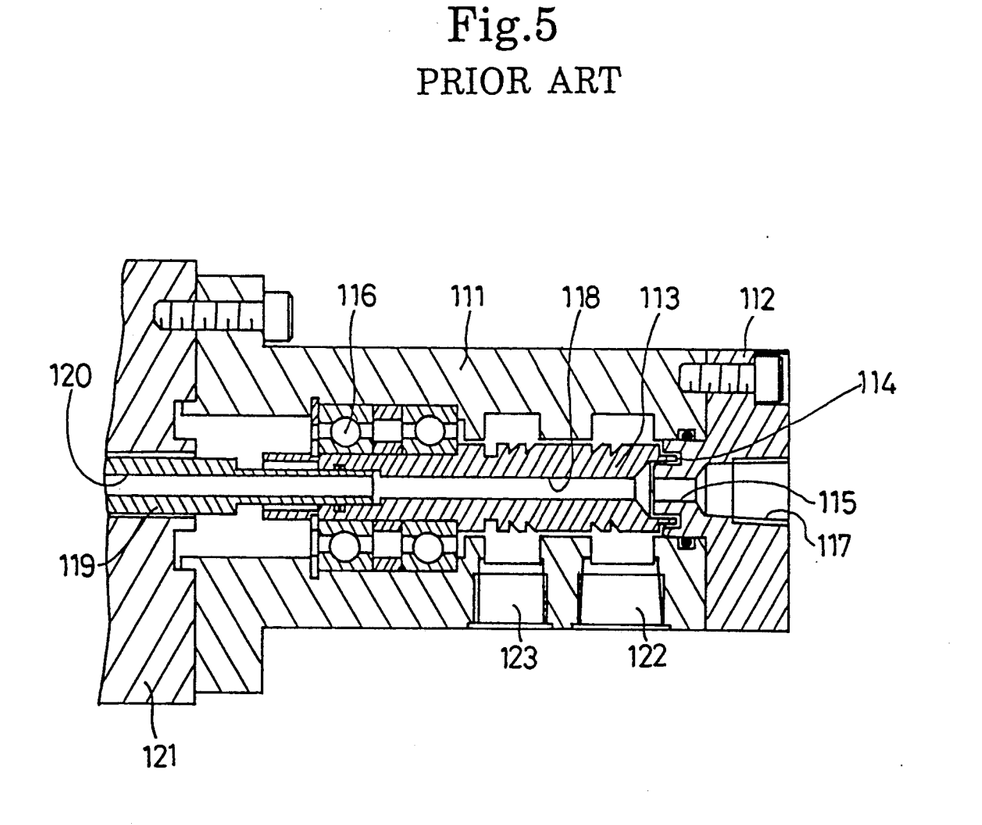
FIG. 5 is a cross-sectional view showing a conventional non-contact type fluid coupling device.

Another type of conventional fluid coupling device is disclosed in Japanese Utility Model Laid-Open Publication No.1-84941. This device is a non-contact type fluid coupling device as shown in FIG. 5. A main shaft 119 is rotatably supported to a frame 121 of a machine tool. An axial fluid passage 120 is formed in the main shaft 119. Bearings 116 are provided in a coupling main body 111, fixed to the frame 121 of the machine tool. A coupling shaft 113 is rotatably supported by the bearings 116. An axial fluid passage 118 is formed in the coupling shaft 113. The left end surface of the coupling shaft 113 is fixed to the main shaft 119. Therefore, the coupling shaft 113 is rotated together with the main shaft 119. Moreover, the fluid passage 118 of the coupling shaft 113 communicates with the fluid passage 120 of the main shaft 119. A rear body 112 is engaged and fixed to the right end surface of the coupling main body 111. A fluid supply port 117, to which the coolant or the fluid is supplied, and a fluid passage 115, which communicates with the fluid passage 118 of the coupling shaft 113, are formed in the rear body 112. A minute space 114 is formed between the right end surface of the coupling shaft 113 and the left end surface of the rear body 112, so that a non-contact condition is maintained between the coupling shaft 113 and the rear body 112. Therefore, the coolant in the fluid passages 118 and 115 is sealed by the minute space 114 when the coolant is supplied from the fluid supply port 117 to the fluid passage 118, of the coupling shaft 113, through the fluid passage 115 in order to supply the coolant to the fluid passage 120 of the main shaft 119 of the machine tool. Any coolant which leaks from the minute space 114 is discharged outside through drain holes 122 and 123 formed in the coupling main body 111.

With the above first described conventional arrangement, where the fluid coupling device is maintained by the contact type mechanical sealing system, in which the follower ring 110 is in facial sliding contact with the end surface of the seat ring 107, the rotational speed of the coupling shaft 103 should be at a relatively low level, otherwise frictional wear may occur at the interfaces of the follower ring 110 and the seat ring 107.

Moreover, if the applied coolant has a high pressure, a high sealing performance at the interface, to prevent the coolant from leaking between the follower ring 110 and the seat ring 107, is required. To achieve this, the biasing force of the spring 109 must be increased. Accordingly, the rotational speed of the coupling shaft 103 must be further lowered to avoid frictional wear.

In summary, the contact type fluid coupling device is therefore not available for high speed rotation of the coupling shaft 103. Further, the contact type fluid coupling device cannot perform idle rotation of the coupling shaft 103 without supplying coolant to protect the sliding surfaces of the follower ring 110 and the seat ring 107. Lastly, a filter unit is required to prevent entry of high hardness particles into the fluid passage when supplying the coolant, otherwise the high hardness particles may damage the sliding surface of the follower ring 110 and the seat ring 107.

On the other hand, the conventional non-contact type fluid coupling device is better for high speed rotation than is the contact type fluid coupling device. However, if the applied fluid has high pressure, fluid leakage may occur so that the coolant leaked from the minute space 114 may enter the bearings 116 to thereby degrade their inherent rotation function. Specially, aqueous coolant or pure water cannot be employed as the coolant passing through the fluid passage 118 since leakage of such a coolant from the minute space 114 may lead to corrosion of the bearings 116.

Further, in the conventional contact type fluid coupling device, the coupling shaft 103 is supported by the bearings 102; and in the conventional non-contact type fluid coupling device, the coupling shaft 113 is supported by the bearings 116. When the coupling shafts 103 or 113 are rotated, the bearings 102 or 116 generate both heat and vibration. The generated heat and the vibration both affect the apparatus on which the fluid coupling device is provided, for example, the machine tool. Moreover, the rotational speed of the coupling shafts 103 or 113 depend on the efficiency of the bearings 102 or 116. In other words, the rotational speed of the rotation shaft to which the fluid is supplied through the fluid coupling device, for example, the main shaft of the machine tool, is limited in accordance with the efficiency of the bearings 102 or 116 of the fluid coupling device.

SUMMARY OF THE INVENTION

An object of the invention is to provide a fluid coupling device which does not limit the rotational speed of a rotary shaft connected thereto.

Another object of the invention is to provide a fluid coupling device which does not generate vibration and heat.

A further object of the invention is to provide a fluid coupling device capable of applying a highly pressurized fluid.

These and other objects of the invention will be attained by providing a fluid coupling device to be mounted on an apparatus having a rotary shaft in order to lead a fluid into the rotary shaft comprising:

a coupling shaft to be connected with the rotary shaft, the coupling shaft supported by only the rotary shaft and rotated together with the rotary shaft;

the coupling shaft formed with a fluid passage extending in an axial direction thereof, the fluid passage opened at both ends of the coupling shaft;

a coupling main body having an inner peripheral surface and a bottom portion, the inner peripheral surface and the bottom portion defining a hollow in which the coupling shaft is inserted in a non-contact state;

the bottom portion of the coupling main body formed with a highly pressurized fluid supply port, the highly pressurized fluid supply port confronting with the fluid passage opened at one end of the coupling shaft;

an outer peripheral surface of the coupling shaft and the inner peripheral surface of the coupling main body defining a pressure reduction passage extending from the one end of the coupling shaft toward the rotary shaft;

the inner peripheral surface of the coupling main body formed with a pressure reduction chamber communicated with the pressure reduction passage;

the coupling main body formed with a drain hole communicated with the pressure reduction chamber and opened at an outer surface of the coupling main body;

the outer peripheral surface of the coupling shaft and the inner peripheral surface of the coupling main body defining a minute space communicated with the pressure reduction camber; and the coupling main body formed with a compressed air supply passage communicated with the minute space and opened at the outer surface of said coupling main body.

In a fluid coupling device of the invention thus constructed, the pressure of the fluid which is supplied from an external source and leaked from the fluid passage aperture of the coupling shaft is reduced by the pressure reduction passage. The fluid passed through the pressure reduction passage enters the pressure reduction chamber. The pressure of the fluid in the chamber is very small compared with the pressure of the supplied fluid. On the other hand, because the compressed air is supplied from the compressed air supply port to the minute space, which is adjacent to the pressure reduction chamber, the air pressure in the minute space can be maintained at a high pressure in comparison with the pressure of the fluid in the pressure reduction chamber. Therefore, the fluid in the pressure reduction chamber is discharged outside only through the drain hole without advancing into the bearing.

As clearly explained above, in the invention, the pressure of the highly pressurized fluid supplied from the outside is reduced by the pressure reduction passage and the pressure reduction chamber, and the fluid in the coupling shaft is sealed by the air pressure in the minute space which communicates with the pressure reduction chamber and does not leak outside. Further, the coupling shaft is supported by only the rotary shaft of the apparatus, so that, the coupling shaft and the coupling main body are completely maintained in the non-contacting state. Therefore, there is no practical limit to the rotational speed of the rotary shaft and any kind of the fluid can be supplied. As a result, a highly pressurized fluid can also be supplied. Moreover, because the rotary shaft and the coupling main body are non-contact, it is possible to perform idle rotation and to have an intermittent fluid application into the fluid passage. In addition, because a bearing is not used in the coupling shaft, it is not present to generate any vibration and heat.

BRIEF DESCRIPTION OF THE DRAWINGS

A preferred embodiment of the invention will be described in detail with reference to the following figures wherein.

DETAILED DESCRIPTION OF THE PREFERRED EMBODIMENT

Figure 1:
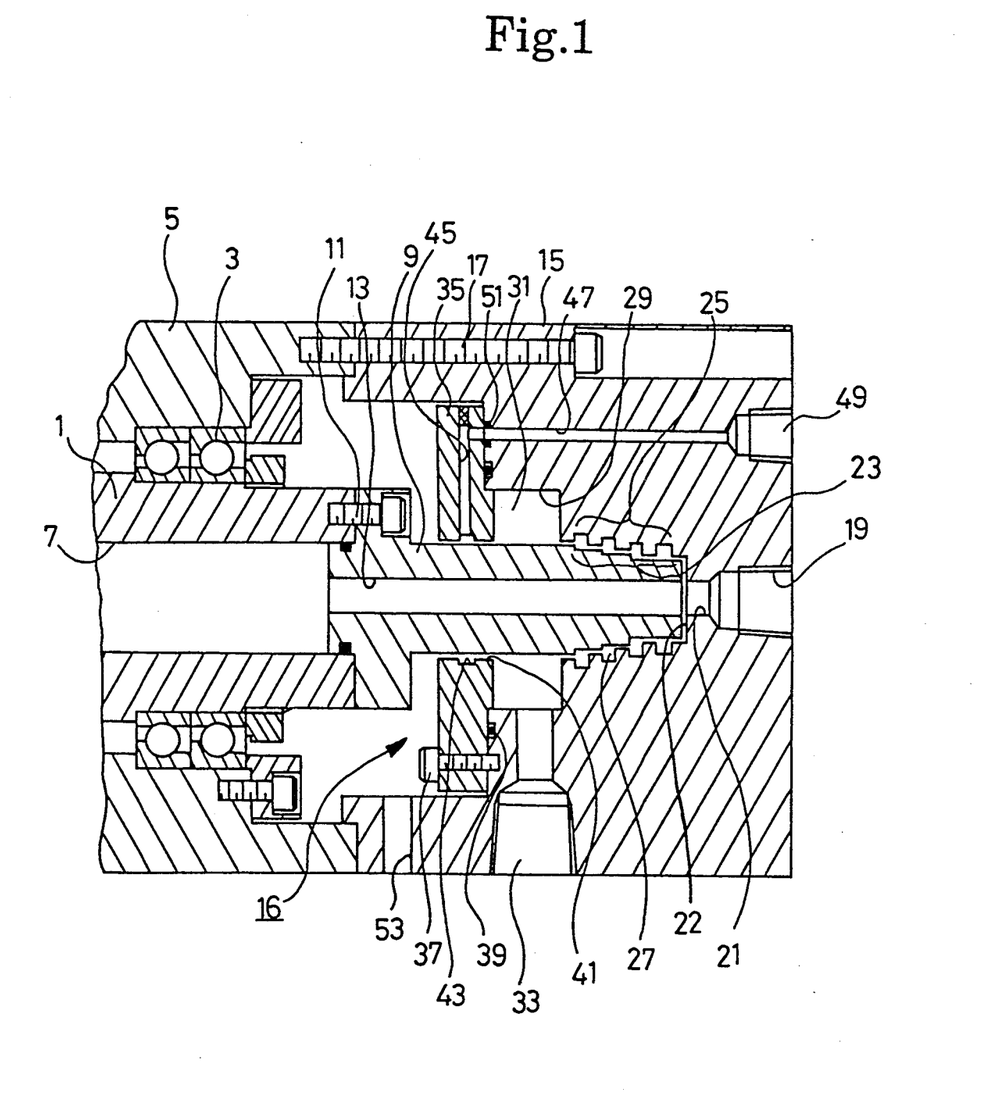
FIG. 1 is a cross-sectional view showing a fluid coupling device according to a first embodiment of the invention.
Figure 2:
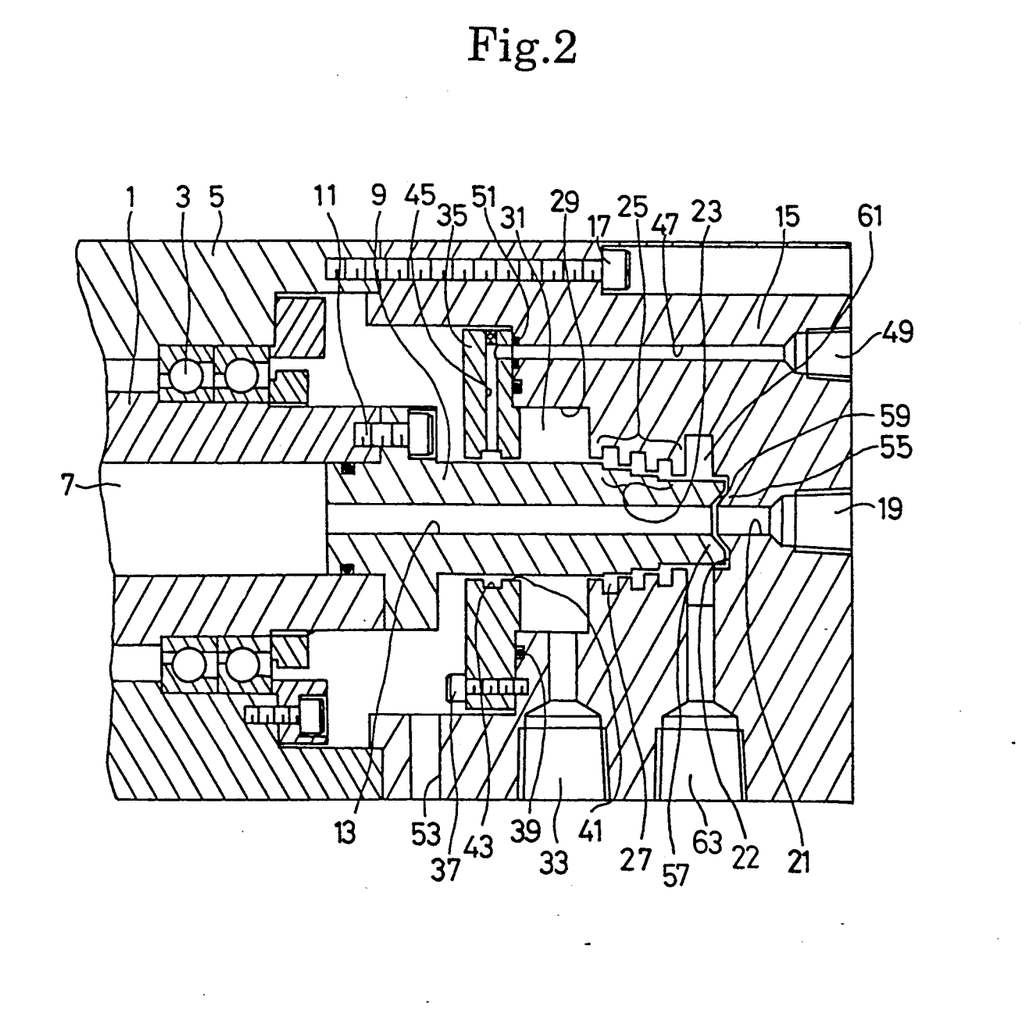
FIG. 2 is a cross-sectional view showing a fluid coupling device according to a second embodiment of the invention.
Figure 3:
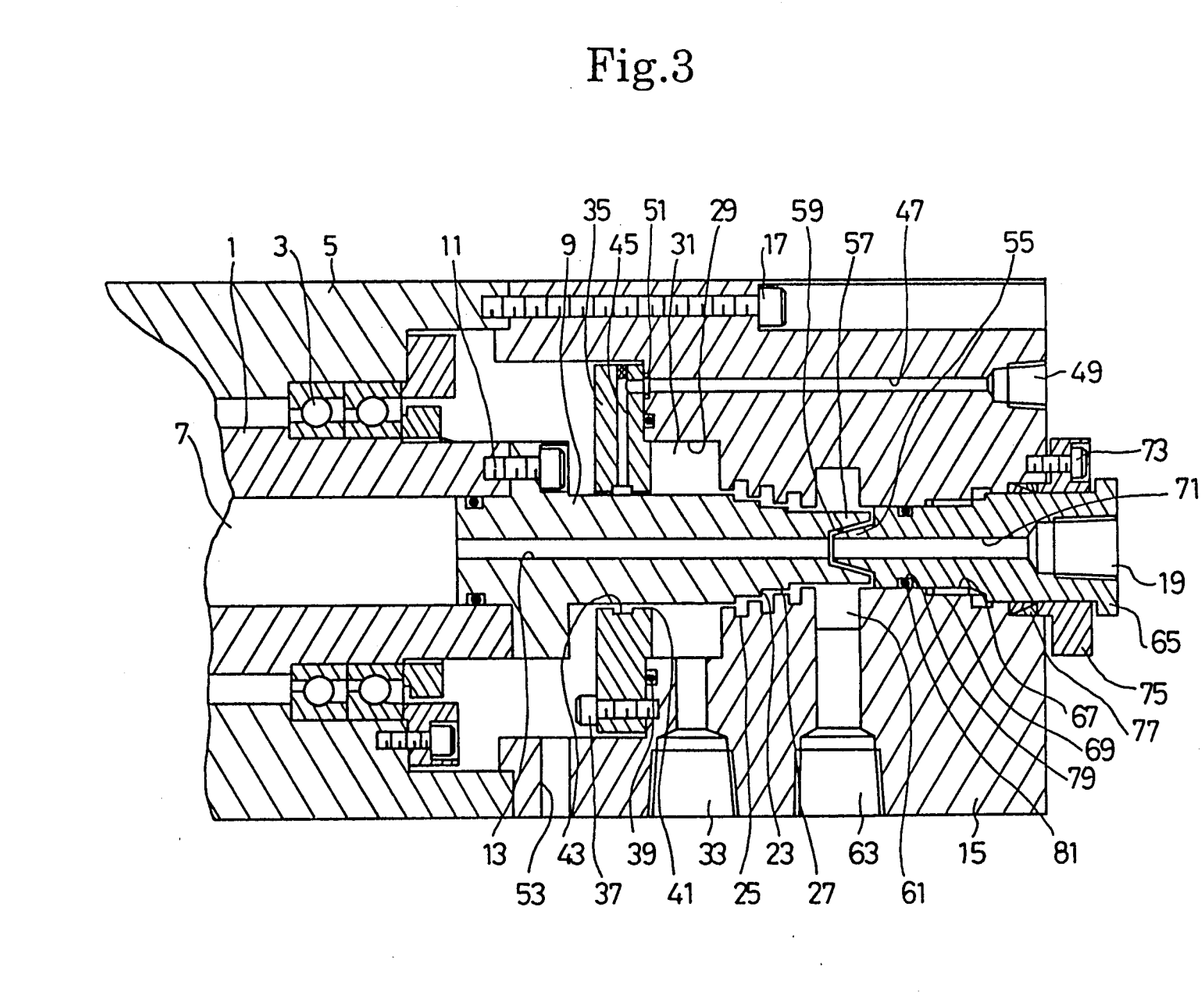
FIG. 3 is a cross-sectional view showing a fluid coupling device according to a third embodiment of the invention.

Hereafter, embodiments of the invention will be described with reference to FIGS. 1-3.

A fluid coupling device according to a first embodiment of the invention will be described with reference to FIG. 1. In FIG. 1, a bearing 3 is provided in a frame 5 of a machine tool. A main shaft 1 of the machine tool is rotatably supported by the bearing 3 as a rotation shaft that is rotated at a high speed. An axial fluid passage 7 is formed in the main shaft 1. At a right end surface of the main shaft 1, a coupling shaft 9 of a fluid coupling device is fixed by a bolt Therefore, the coupling shaft 9 rotates together with the main shaft 1. An axial rotational fluid passage 13, which communicates with the fluid passage 7, is formed in the coupling shaft 9. A coupling main body 15, of the fluid coupling device, is engaged and is fixed by a bolt 17 to the right end surface of the frame 5 (as shown in FIG. 1). A highly pressurized fluid supply port 19 is formed in the middle of the right end surface of the coupling main body 15. A stationary fluid passage 21, which communicates with the highly pressurized fluid supply port 19, opens to the bottom surface of the hollow 22 of the coupling main body 15. One end of the coupling shaft 9 is inserted into the hollow of the coupling main body 15, to confront the stationary fluid passage 21, so that the rotational fluid passage 13 and the stationary fluid passage 21 communicate and a highly pressurized fluid can be supplied to the coupling shaft 9.

A plurality of steps 23 are formed in an outer peripheral surface of the right end of the coupling shaft 9, and a plurality of annular grooves 25 are formed in an inner peripheral surface of the coupling main body 15 which communicate with the stationary fluid passage 21. The steps 23 and the annular grooves 25 constitute a labyrinth seal having a minute space between them so as to form a pressure reduction passage 27.

An annular recess 29 is formed in the coupling main body 15 adjacent to the pressure reduction passage 27. The annular recess 29 forms a pressure reduction chamber 31 with the outer peripheral surface of the coupling shaft 9. A drain hole 33 open between the annular recess 29 and the atmosphere is formed through the coupling main body 15. A ring flange member 35 is arranged adjacent to the annular recess 29, formed in the coupling main body 15, and is fixed to the coupling main body 15 by a bolt 37. The flange member 35 and the coupling main body 15 are sealed by an 0 ring 39. A minute space 41 is formed between an inner peripheral surface of the flange member 35 and an outer peripheral surface of the coupling shaft 9 so that a non-contact condition is maintained between them.

An annular groove 43 is formed in the inner peripheral surface of the flange member 35 and a compressed air supply passage 45, which communicates with the annular groove 43, is formed in the flange member 35.

A compressed air supply passage 47, which communicates with a compressed air supply passage 45, is formed in the coupling main body 15. A compressed air supply port 49, which communicates with the compressed air supply passage 47, is opened in the right end surface of the coupling main body 15. An 0 ring 51 seals the flange member 35 and the coupling main body 15 to prevent the compressed air from leaking from passages 47, 45. The compressed air supply port 49, the compressed air supply passage 47, the compressed air supply passage 45 and the annular groove 43 constitute an air passage through which the compressed air is supplied to the minute space 41. Moreover, an air exhaust port 53 opens through the coupling main body 15 to the atmosphere.

The fluid coupling device of the present embodiment operates as follows.

Highly pressurized fluid, such as machining or cutting water, is supplied to the highly pressurized fluid supply port 19, formed in the right end surface of the coupling main body 15. When the highly pressurized fluid is supplied, compressed air is simultaneously supplied to the compressed air supply port 49, also formed in the end surface of the coupling main body 15. The highly pressurized fluid is supplied to the fluid passage 7 of the main shaft 1 through the stationary fluid passage 21 and the rotational fluid passage 13 formed in the coupling shaft 9. A part of the highly pressurized fluid may leak between the bottom surface of the hollow 22 of the coupling main body 15 and the end surface of the coupling shaft, and passes into the pressure reduction chamber 31 through the pressure reduction passage 27. The highly pressurized fluid is subjected to a large frictional resistance when the highly pressurized fluid passes through the pressure reduction passage 27. The pressure of the highly pressurized fluid is reduced during passage through the pressure reduction passage 27. In this case, since the cross-sectional area of the pressure reduction chamber 31 is far greater than that of the minute space of the pressure reduction passage 27, the pressure of pressurized fluid in the chamber 31 is much smaller than that of the fluid passing through the passages 13 and 21. Thus, the fluid which flows into the pressure reduction chamber 31 is discharged outside coupling main body 15 through the drain hole 33.

On the other hand, the compressed air supplied from the compressed air supply port 49 fills the annular groove 43 formed on the inner peripheral surface of the flange member 35 and the minute space 41 and, from there, passes outside of the coupling main body 15 through exhaust port 53 or into the pressure reduction chamber 31. Since the pressure of the fluid in the pressure reduction chamber 31 has been reduced, the air pressure in the annular groove 43 and the minute space 41 can be maintained at a pressure higher than that of the fluid pressure in the pressure reduction chamber 31. As a result the fluid in the pressure reduction chamber 31 does not advance beyond the coupling main body 15.

In the first embodiment, as described above, a pressure reduction passage is provided between the feed of the highly pressurized fluid and the pressure reduction chamber so that the pressure of the fluid passing therethrough is decreased and the volume of the fluid is limited.

However, when the pressure or the volume of the highly pressurized fluid is greater, arrangement of a plurality of pressure reduction passages and pressure reduction chambers can prevent the fluid from leaking beyond the fluid coupling device.

A fluid coupling device according to a second embodiment of the present invention will next be described with reference to FIG. 2. The same reference numbers are used for the same members as those of FIG. 1, and their explanation is omitted.

In the second embodiment, a tapered nozzle portion 55 is formed in the exit side of the stationary passage 21, which is in the bottom surface of the hollow 22 formed in the coupling main body 15. A tapered recess 57 is formed in the end of the rotational fluid passage 13 of the coupling shaft 9 which communicates with the stationary passage 21. The nozzle portion 55 and the tapered recess 57 define a minute space between them providing a non-contact condition so as to form a second pressure reduction passage 59. A second pressure reduction chamber 61 is formed between the pressure reduction passage 27 and the second pressure reduction passage 59. A second drain hole 63 is formed through the coupling main body 15 between the second pressure reduction chamber 61 and the atmosphere.

In the fluid coupling device thus structured, a part of the highly pressurized fluid supplied from the highly pressurized fluid supply port 19 of the coupling main body 15 flows into the second pressure reduction passage 59 and the direction of flow is greatly changed. As a result, a large frictional resistance acts on the highly pressurized fluid, passing through the second pressure reduction passage 59, so that the pressure of the fluid is reduced. Then, the cross-sectional area of the fluid passage rapidly expands in the second pressure reduction chamber 61 to greatly reduce the pressure of the fluid. A significant portion, if not all, of the fluid flowing into the pressure reduction chamber 61 is discharged outside the coupling main body 15 from the second drain hole 63. A part of the fluid in the pressure reduction chamber 61 may flow into the pressure reduction chamber 31 through the pressure reduction passage 27. They operate as described in the first embodiment. Moreover, the second pressure reduction passage 59 can be constructed with a labyrinth similar to that of pressure reduction passage 57. Further, it is possible to construct the nozzle portion separate from the coupling main body, using a special nozzle member so that the space between the nozzle portion and the tapered recess, formed on the coupling shaft, can be adjusted to improve the pressure descent.

A fluid coupling device according to a third embodiment of the present invention will be described with reference to FIG. 3. The same reference numbers are applied to the same members as found in FIGS. 1 and 2, and their explanation is omitted.

A screw thread 67 is provided on an outer surface of a nozzle main body 65 that is inserted into the coupling main body 15. The screw thread 67 engages a screw thread 69, provided on an inner surface of the coupling main body 15, so that the nozzle main body 65 is adjustable along the axial direction by screwing the nozzle main body 65 to a greater or lesser extent into the coupling main body 15. The highly pressurized fluid supply port 19 and a fluid passage 71, which communicates with the highly pressurized fluid supply port 19, are provided along the longitudinal axis of the nozzle main body 65. The nozzle main body 65 is rotated to move in the direction of the main shaft, so that the space between the tapered recess 57, formed in the coupling shaft 9, and the tapered nozzle portion 55 defining the second pressure reduction passage 59 can be finely adjusted to a width such as about 0.01 mm. When a bolt 73 is tightened under such a condition, a flange 75 compresses a pair of taper rings 77. As a result, the pair of taper rings 77 expand in a radial direction and the nozzle main body 65 is fixed to the coupling main body 15. An 0 ring 81, which is engaged with an annular groove 79 formed on the nozzle main body 65, seals the nozzle main body 65 and the coupling main body 15.

In the device thus constructed, the space of the second pressure reduction passage 59, which is defined by the tapered recess 57 formed in the coupling shaft 9 and the tapered nozzle portion 55 formed on the nozzle main body 65, can be finely adjusted while maintaining the non-contact condition. Therefore, the pressure loss can be increased and the volume of the leaked fluid can be decreased.

Moreover, the coefficient of viscosity changes according to the type of fluid supplied. The optimum sectional area of the pressure reduction passage depends on the coefficient of viscosity of the fluid. In this embodiment, since the space between the tapered recess 57 and the nozzle portion 55 can be adjusted, the optimum sectional area of the pressure reduction passage can be set according to the type of fluid.

In addition, the space between the tapered recess 57 and the nozzle portion 55 may not coincide with the predetermined value due to a sizing assembly error in the coupling main body. According to this embodiment, the space between the tapered recess 57 and the nozzle portion 55 can be adjusted after assembly so that the optimum sectional area of the pressure reduction passage can be set even if there is a sizing or assembly error of the coupling main body during the original assembly.

What is claimed is:

1. A fluid coupling device to be mounted on an apparatus having a rotary shaft, the rotary shaft rotatably mounted in the apparatus, in order to lead a fluid into said rotary shaft, comprising:
   a coupling shaft;
   means for attaching said coupling shaft to said rotary shaft, said coupling shaft supported through the attachment means by only said rotary shaft and rotated together with said rotary shaft and said coupling shaft formed with a fluid passage extending in an axial direction thereof, said fluid passage opened at both ends of said coupling shaft;
   a coupling main body having an inner peripheral surface and a bottom portion, said inner peripheral surface and said bottom portion defining a hollow in which said coupling shaft is inserted in a non-contact state;
   said bottom portion of said coupling main body formed with a highly pressurized fluid supply port, said highly pressurized fluid supply port opposing said fluid passage opened at one end of said coupling shaft;
   an outer peripheral surface of said coupling shaft and said inner peripheral surface of said coupling main body defining a pressure reduction passage extending from said one end of said coupling shaft toward said rotary shaft, said inner peripheral surface of said coupling main body formed with a pressure reduction chamber communicated with said pressure reduction passage, said coupling main body formed with a drain hole communicated with said pressure reduction chamber and opened at an outer surface of said coupling main body, said outer peripheral surface of said coupling shaft and said inner peripheral surface of said coupling main body defining a minute space positioned on a side of said pressure reduction chamber away from said one end of said coupling shaft, and said coupling main body formed with a compressed air supply passage communicated with said minute space and opened at said outer surface of said coupling main body.

2. The fluid coupling device according to claim 1, wherein said one end of said coupling shaft inserted into said hollow has a tapered recess and said bottom portion has a tapered nozzle, said tapered nozzle and tapered recess defining a second pressure reduction passage.

3. The fluid coupling device according to claim 2, wherein said bottom portion of said coupling main body has an opening therein and further comprises:
   a nozzle main body adjustably received in said opening in said coupling main body, said nozzle main body having said highly pressurized fluid supply port therein and providing said tapered nozzle opposed to said tapered recess; and
   means for adjusting said nozzle main body in said opening.

4. The fluid coupling device according to claim 2, further comprising a second pressure reduction chamber between and in communication with both said second pressure reduction passage and said pressure reduction passage.

5. The fluid coupling device according to claim 4, further comprising a drain hole from said second pressure reduction chamber through said coupling main body and opening at said outer surface thereof.

6. The fluid coupling device according to claim 1, further comprising at least one more combination of a pressure reduction passage and a pressure reduction chamber between said bottom portion and said pressure reduction passage and in communication therewith.

7. The fluid coupling device according to claim 6, further comprising a drain hole from each pressure reduction chamber of said at least one combination through said coupling main body to an outer surface thereof.

8. A fluid coupling device to be mounted in an apparatus having a rotary shaft, the rotary shaft rotatably mounted in the apparatus, in order to lead a fluid into said rotary shaft, comprising:

a coupling shaft;

means for attaching said coupling shaft to said rotary shaft and rotated together with said rotary shaft;

said coupling shaft formed with a fluid passage extending in an axial direction thereof, said fluid passage opened at both ends of said coupling shaft;

a tapered recess portion formed at one end of said coupling shaft;

a coupling main body having an inner peripheral surface and a bottom portion, said inner peripheral surface and said bottom portion defining a hollow in which said coupling shaft is inserted in a non-contact state;

a tapered nozzle portion formed at said bottom portion of said coupling main body and confronting with said tapered recess portion, said tapered nozzle portion formed with a highly pressurized fluid support port; and an outer peripheral surface of said coupling shaft and said inner peripheral surface of said coupling main body defining a pressure reduction passage extending from said one end of said coupling shaft toward said rotary shaft, said inner peripheral surface of said coupling main body formed with a pressure reduction chamber communicated with said pressure reduction passage, and said coupling main body formed with a drain hole communicated with said pressure reduction chamber and opened at an outer surface of said coupling main body.

9. The fluid coupling device according to claim 8, wherein said outer peripheral surface of said coupling shaft and said inner peripheral surface of said coupling main body defines a minute space positioned on a side of said pressure reduction chamber away from said one end of said coupling shaft, and wherein said coupling main body is formed with a compressed air supply passage communicated with said minute space and opened at said outer surface of said coupling main body.

10. The fluid coupling device according to claim 8, wherein said coupling shaft is supported by only said rotary shaft.

11. A fluid coupling device to be mounted on an apparatus having a rotary shaft, the rotary shaft rotatably mounted in the apparatus, in order to lead a fluid into said rotary shaft, comprising:

a coupling shaft;

means for attaching said coupling shaft to said rotary shaft, said coupling shaft rotated together with said rotary shaft and said coupling shaft formed with a fluid passage extending in an axial direction thereof, said fluid passage opened at both ends of said coupling shaft;

a coupling main body having an inner peripheral surface and a bottom portion, said inner peripheral surface and said bottom portion defining a hollow in which said coupling shaft is inserted in a non-contact state, said bottom portion of said coupling body having an opening therein;

a nozzle movably received in said opening in said bottom portion of said coupling main body and confronting with said fluid passage opened at one end of said coupling shaft, whereby a space between said nozzle and said one end of said coupling shaft can be adjusted by moving said nozzle, said nozzle formed with a highly pressurized fluid support port;

means for moving said nozzle in said opening; and an outer peripheral surface of said coupling shaft and said inner peripheral surface of said coupling shaft defining a pressure reduction passage extending from said one end of said coupling shaft toward said rotary shaft, said inner peripheral surface of said coupling main body formed with a pressure reduction chamber communicated with said pressure reduction passage, and said coupling main body formed with a drain hole communicated with said pressure reduction chamber and opened at an outer surface of said coupling main body.

12. The fluid coupling device according to claim 11, wherein said outer peripheral surface of said coupling shaft and said inner peripheral surface of said coupling main body defines a minute space positioned on a side of said pressure reduction chamber away from said one end of said coupling shaft, and wherein said coupling main body formed with a compressed air supply passage communicated with said minute space and opened at said outer surface of said coupling main body.

13. The fluid coupling device according to claim 11, wherein said coupling shaft is supported by only said rotary shaft.

* * * * *